US007036795B2

(12) United States Patent
Izumisawa

(10) Patent No.: US 7,036,795 B2
(45) Date of Patent: May 2, 2006

(54) VALVE APPARATUS FOR AIR TOOL

(75) Inventor: Nobuyuki Izumisawa, Itabashi-ku (JP)

(73) Assignee: Kabushiki Kaisha Shinano Seisakusho, Tokyo (JP)

( * ) Notice: Subject to any disclaimer, the term of this patent is extended or adjusted under 35 U.S.C. 154(b) by 0 days.

(21) Appl. No.: 10/992,538

(22) Filed: Nov. 17, 2004

(65) Prior Publication Data

US 2005/0103306 A1 May 19, 2005

(30) Foreign Application Priority Data

Nov. 17, 2003 (JP) ......................... 2003-272523 U

(51) Int. Cl.
*F16K 51/00* (2006.01)

(52) U.S. Cl. ...................... 251/285; 251/339; 173/221; 173/169

(58) Field of Classification Search ................ 251/285, 251/339; 173/221, 169, 218
See application file for complete search history.

(56) References Cited

U.S. PATENT DOCUMENTS 3,354,732 A * 11/1967 Wickham ................... 251/285
3,734,459 A * 5/1973 Sauerwein et al. ......... 251/285
5,346,024 A * 9/1994 Geiger et al. ............... 173/221
5,918,686 A * 7/1999 Izumisawa .................. 173/169
6,062,323 A * 5/2000 Pusateri et al. ............. 173/169
6,135,213 A * 10/2000 Schoeps ..................... 173/169

OTHER PUBLICATIONS

Description of Chicago Pneumatic 3/8" Reversible Drill extra Heavy Duty CP-789R-26 on Jack-X-Change website.

* cited by examiner

*Primary Examiner*—John Bastianelli
(74) *Attorney, Agent, or Firm*—Jordan and Hamburg LLP

(57) ABSTRACT

A valve apparatus for an air tool which has a valve rotatably disposed in a cylinder portion of a body of the air tool in which an air motor is accommodated; and a lever fixed to the valve and slidably received within a slit-shaped opening formed in the cylinder portion. The valve includes a first disc portion having an air inlet, a lever-fixing portion having an air passage which communicates with the air inlet, and a second disc portion having an air outlet which communicates with the air passage. The lever-fixing portion is narrower than the first and second disc portions. The lever has a knob portion slidable within the opening and a generally U-shaped engagement portion fixed to the lever-fixing portion so that two legs of the engagement portion sandwich the lever-fixing portion from diametrically opposite sides.

5 Claims, 3 Drawing Sheets

VALVE APPARATUS FOR AIR TOOL

BACKGROUND OF THE INVENTION

1. Field of the Invention

The present invention relates to a valve apparatus for an air tool, and more particularly to a valve apparatus suitable for air drivers, air drills, air sanders, and the like.

2. Description of the Related Art

As in the case of a ⅜" reversible air drill (model number: CP-789R-26) of Chicago Pneumatic (see http://www.jack-xchange.com/products/CP-789R-26.cfm), a conventional valve apparatus for an air tool includes a valve rotatably disposed in a cylinder portion of the body in which an air motor is accommodated, and a lever which is screwed to the valve and is supported to be slidable within a slit-shaped opening formed in the cylinder portion.

In such a valve apparatus for an air tool in which a lever is screwed to the valve, reducing the width (axial length) of the valve is difficult, because a threaded hole must be formed in the valve. Air tools include those which require a reverse valve for changing the rotational direction of an air motor between regular rotation and reverse rotation, such as air drills and air drivers, and those which require a regulator valve for changing output of an air motor between low output and high output, such as air sanders.

However, because of its structure, the above-described conventional valve apparatus for an air tool cannot permit use of a common body between an air driver including a reverse valve and an air sander including a regulator valve. In other words, the body for air drivers cannot be used as a body for air sanders.

SUMMARY OF THE INVENTION

In view of the above-described problem of the conventional valve apparatus for an air tool, an object of the present invention is to provide a valve apparatus for an air tool which enables compatible attachment of a reverse valve and a regulator valve to a body, thereby enabling common use of the same body between, for example, an air driver and an air sander.

In order to achieve the above object, the present invention provides a valve apparatus for an air tool which comprises a valve rotatably disposed in a cylinder portion of a body of the air tool in which portion an air motor is accommodated; and a lever fixed to the valve and slidably received within a slit-shaped opening formed in the cylinder portion. The valve includes a first disc portion having an air inlet, a lever-fixing portion having an air passage which communicates with the air inlet, and a second disc portion having an air outlet which communicates with the air passage. The lever-fixing portion is narrower than the first and second disc portions as measured along a direction perpendicular to a center axis of the valve. The lever has a knob portion slidable within the opening and a generally U-shaped engagement portion fixed to the lever-fixing portion so that two legs of the engagement portion sandwich the lever-fixing portion from diametrically opposite sides.

The valve may be a reverse valve or a regulator valve. Preferably, the lever fixing portion has a generally trapezoidal cross section. Preferably, the valve includes two O-rings provided at the first and second disc portions, respectively, and the valve is rotatably supported by an inner wall surface of the cylinder portion via the O-rings.

The valve apparatus of the present invention enables common use of the same body between reversible-type air tools and regulator-type air tools, to thereby reduce manufacturing cost of dies for the body.

DESCRIPTION OF THE PREFERRED EMBODIMENT

An embodiment of the present invention will be described with reference to the drawings.

Figure 1:
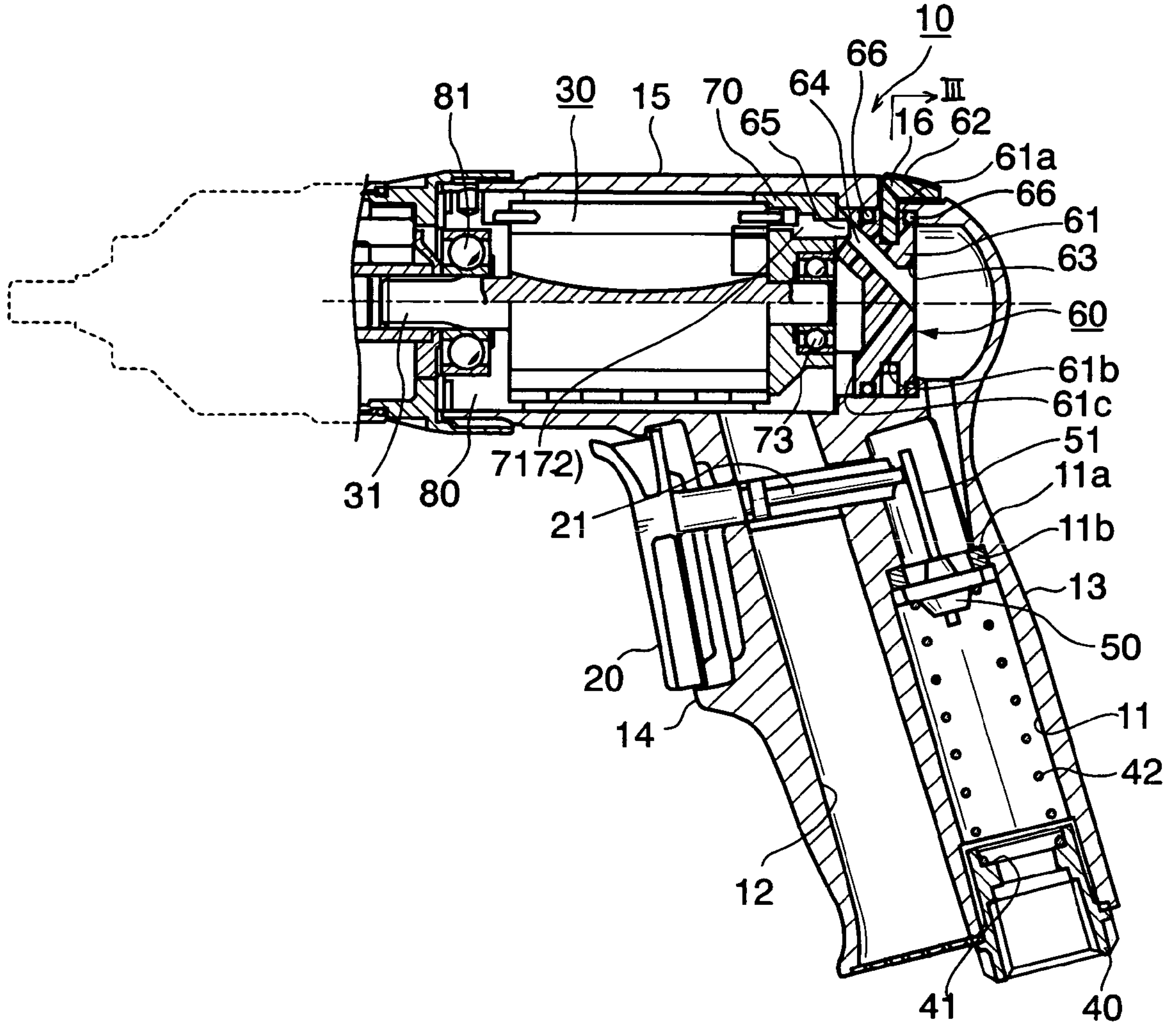
FIG. 1 is a longitudinal sectional view of an air tool including a valve apparatus according to an embodiment of the present invention.
Figure 2:
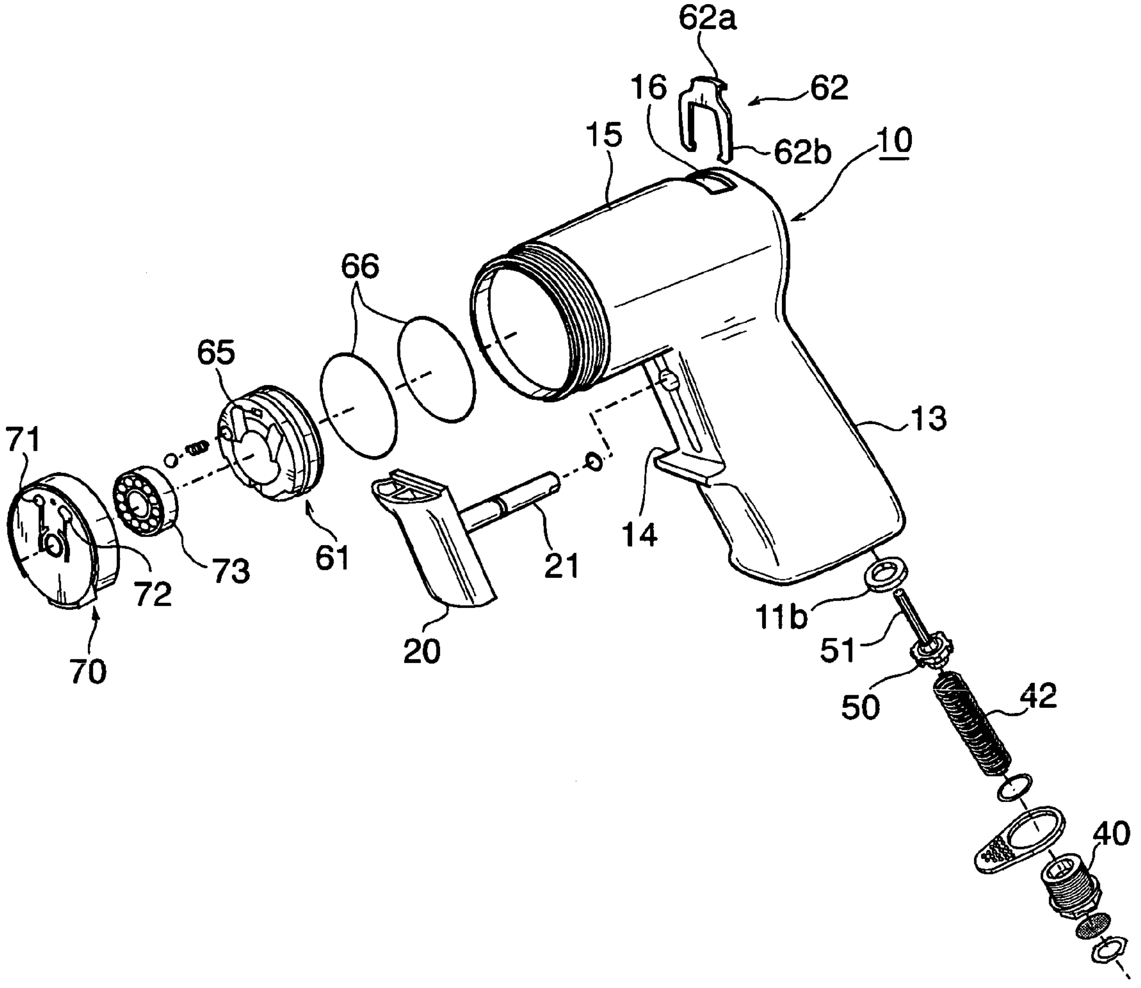
FIG. 2 is an exploded perspective view of the air tool of FIG. 1.

In FIG. 1, reference numeral 10 denotes a body of an air tool. The body 10 includes a grip portion 13 which has an air supply passage 11 and an air exhaust passage 12 formed therein; a trigger portion 14 which is formed above the grip portion 13 and supports a trigger 20; and a cylinder portion 15 which is formed above the trigger portion 14 and accommodates an air motor 30 therein.

A bushing 40 is fitted into the lower end of the air supply passage 11. A step 11*a* is formed at a middle portion of the air supply passage 11. A trigger valve 50 is seated on the step 11*a* via a valve seat 11*b*.

A valve spring 42 is disposed between the trigger valve 50 and a receiving portion 41 which is formed in an upper portion of the bushing 40. Thus, the trigger valve 50 is pushed against the valve seat 11*b* by means of the valve spring 42.

A pin 51 is affixed to the trigger valve 50, and is connected to a connecting rod 21 of the trigger 20. Thus, when the trigger 20 is pushed, the connecting rod 21 is moved rightward in FIG. 1, whereby the pin 51 is tilted, and the trigger valve 50 is opened.

When the trigger 20 is not pushed, the valve spring 42 presses the trigger valve 50 against the valve seat 11*b*, so that the trigger valve 50 is closed, and the pin 51, the connecting rod 21, and the trigger 20 are returned to their original positions.

The air supply passage 11 communicates with a valve apparatus 60, which is disposed within the rear end of the cylinder portion 15. The valve apparatus 60 includes a valve 61 disposed to be rotatable relative to the cylinder body 15 and a lever 62 fixed to the valve 61 and slidably received in a slit-shaped opening 16 formed in the cylinder portion 15. The valve 61 of the embodiment of FIG. 1 is a reverse valve for switching the direction of rotation of the air motor 30 between forward and reverse directions.

Figure 3:
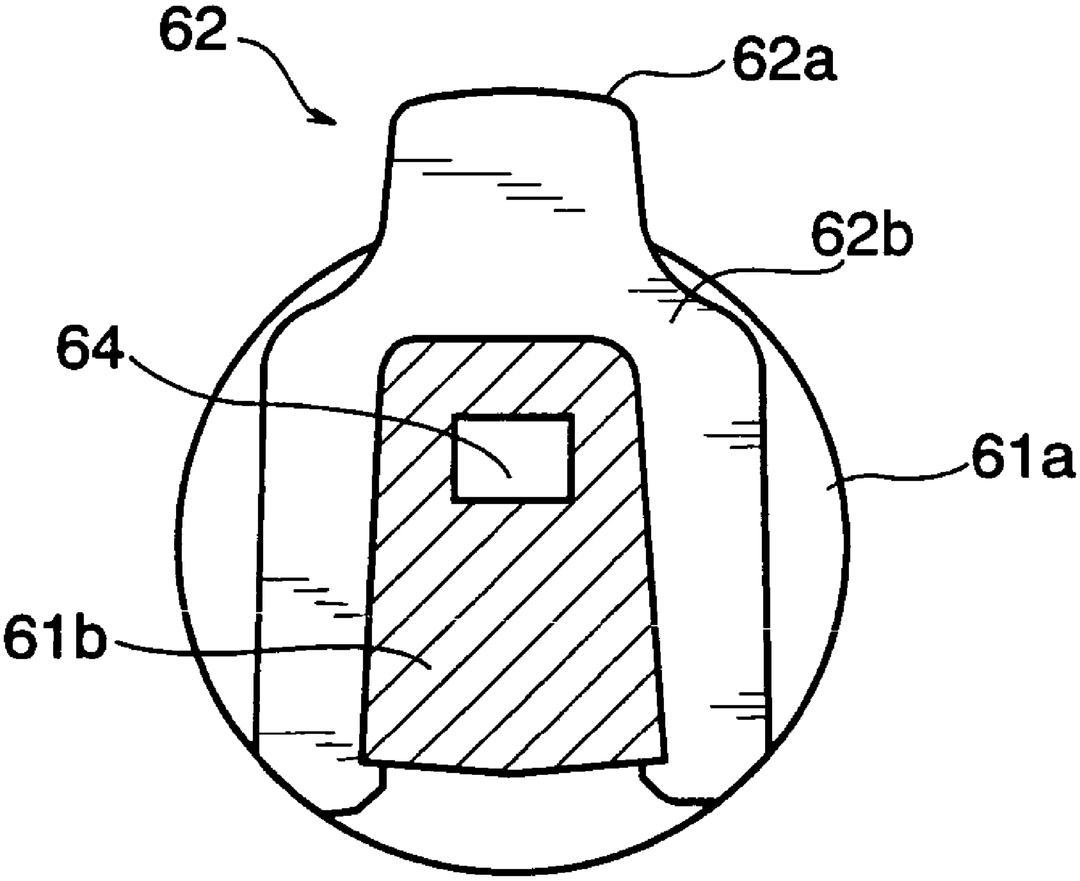
FIG. 3 is a cross sectional view taken along line III—III in FIG. 1.

The valve 61 includes a first disc portion 61*a* having an air inlet 63; a lever-fixing portion 61*b* having an air passage 64 which communicates with the air inlet 63; and a second disc portion 61*c* having an air outlet 65 which communicates with the air passage 64. As shown in FIG. 3, the lever-fixing portion 61*b* has a trapezoidal cross section having a width (base-side dimension) smaller than diameters of the first and second disc portions 61*a* and 61*c*.

The lever 62 has a knob portion 62*a* slidably received in the opening 16, and a generally U-shaped engagement portion 62*b* fixed to the lever-fixing portion 61*b*. The U-shaped engagement portion 62*b* has two legs which sandwich the lever-fixing portion 61*b* from diametrically opposite sides. The valve 61 includes two O-rings 66 provided at the first and second disc portions 61*a* and 61*c*, respectively, and the valve 61 is rotatably supported by an inner wall surface of the cylinder portion 15 via the O-rings 66.

The valve 61, which is in contact with a back plate 70 of the air motor 30, is rotated, while being slid on the back plate 70. When the air outlet 65 is connected to an air hole 71 for forward rotation formed in the back plate 70, the air motor 30 rotates in the forward direction. When the air outlet 65 is connected to an air hole 72 for reverse rotation formed in the back plate 70, the air motor 30 rotates in the reverse direction.

A rotor shaft 31 of the air motor 30 is rotatably supported by means of a bearing 73 fixed to the back plate 70 and a bearing 81 fixed to a front plate 80.

The valve 61 may be a reverse valve or a regulator valve. In the case where the valve 61 is a reverse valve, the air motor 30 rotates forward in response to an operation of rotating the valve 61 clockwise by sliding the lever 62, and rotates in reverse in response to an operation of rotating the valve 61 counterclockwise by sliding the lever 62. In the case where the valve 61 is a regulator valve, the air motor 30 is switched from a low output mode (L) to a high output mode (H) in response to an operation of rotating the valve 61 clockwise by sliding the lever 62, and is switched from the high output mode (H) to the low output mode (L) in response to an operation of rotating the valve 61 counterclockwise by sliding the lever 62.

What is claimed is:

1. A valve apparatus for an air tool which comprises:

a valve rotatably disposed in a cylinder portion of a body of the air tool, the cylinder portion accommodating an air motor; and a lever fixed to the valve and slidably received within a slit-shaped opening formed in the cylinder portion, wherein the valve includes a first disc portion having an air inlet, a lever-fixing portion having an air passage which communicates with the air inlet, and a second disc portion having an air outlet which communicates with the air passage, wherein the lever-fixing portion is narrower than the first and second disc portions as measured along a direction perpendicular to a center axis of the valve; and the lever has a knob portion slidable within the opening and a generally U-shaped engagement portion fixed to the lever-fixing portion so that two legs of the engagement portion sandwich the lever-fixing portion from diametrically opposite sides.

2. A valve apparatus for an air tool according to claim 1, wherein the valve is a reverse valve.

3. A valve apparatus for an air tool according to claim 1, wherein the valve is a regulator valve.

4. A valve apparatus for an air tool according to claim 1, wherein the lever fixing portion has a generally trapezoidal cross section.

5. A valve apparatus for an air tool according to claim 1, wherein the valve includes two O-rings provided at the first and second disc portions, respectively, and the valve is rotatably supported by an inner wall surface of the cylinder portion via the O-rings.

* * * * *